United States Patent
Prikryl (10) Patent No.: US 12,412,012 B2
(45) Date of Patent: Sep. 9, 2025

(54) METHOD FOR AUTOMATIC PROCESSOR DESIGN, VALIDATION, AND VERIFICATION

(71) Applicant: Codasip s.r.o., Brno (CZ)

(72) Inventor: Zdenek Prikryl, Brno (CZ)

(73) Assignee: CODASIP, s.r.o., Brno (CZ)

( * ) Notice: Subject to any disclaimer, the term of this patent is extended or adjusted under 35 U.S.C. 154(b) by 331 days.

(21) Appl. No.: 17/230,898

(22) Filed: Apr. 14, 2021

(65) Prior Publication Data

US 2022/0335186 A1 Oct. 20, 2022

(51) Int. Cl.
*G06F 30/30* (2020.01)
*G06F 30/31* (2020.01)
*G06F 30/33* (2020.01)
*G06F 115/10* (2020.01)

(52) U.S. Cl.
CPC .............. *G06F 30/31* (2020.01); *G06F 30/33* (2020.01); *G06F 2115/10* (2020.01)

(58) Field of Classification Search
CPC ...... G06F 30/31; G06F 30/33; G06F 2115/10; G06F 30/327; G06F 30/3308
See application file for complete search history.

(56) References Cited

U.S. PATENT DOCUMENTS

| | | | |
|---|---|---|---|
| 9,235,669 B2* | 1/2016 | Prikryl | G06F 30/30 |
| 9,235,670 B2* | 1/2016 | Prikryl | G06F 30/20 |
| 9,280,326 B1* | 3/2016 | Braun | G06F 8/37 |
| 10,698,472 B2* | 6/2020 | Mednick | G06F 12/0875 |
| 2015/0234965 A1* | 8/2015 | Prikryl | G06F 30/20 716/102 |
| 2024/0061984 A1* | 2/2024 | Prikryl | G06F 30/367 |

* cited by examiner

*Primary Examiner* — Jack Chiang
*Assistant Examiner* — Brandon Bowers
(74) *Attorney, Agent, or Firm* — pkalousek.ip (57) ABSTRACT

A method for automatic design of a processor and programming and simulation tools, comprising developing a single model of a processor from processor's specifications; providing the single model of the processor to an Electronic Design Automation tool, which automatically generates a hardware description and programming and simulation tools from the single processor model, and automatically determines validity of the single model of the processor, is disclosed. The method further comprises automatic verification of the designed processor.

22 Claims, 2 Drawing Sheets

METHOD FOR AUTOMATIC PROCESSOR DESIGN, VALIDATION, AND VERIFICATION

BACKGROUND

1. Field

The present invention relates to processor design, validation, and verification. More particularly, this invention is directed toward an automation of processor design, validation, and verification.

2. Description of Related Technology

Electronic devices play an important role in our daily life, being used in various areas, e.g., entertainment (game consoles), communication (mobile phones), health care (diagnostic equipment), and the like. The functionality of such devices may use dedicated hardware units or processors. Dedicated hardware units implement specific function(s) are usually employed in specialized devices due to potentially high performance, low power consumption, small size of an area on a chip, and other advantages known to a person of ordinary skill in the art. However, the specific function(s) are disadvantageous in devices requiring changes due to, e.g., changes to the specific function, transition to the new standard, and similar events, where processors, i.e., logic circuitry that responds to and processes the basic instructions, are preferred due to their programmability by change in the instructions.

A general purpose processor may be characterized as a processor which is not tied to or integrated with a particular application domain or piece of software. This flexibility comes with at the expense of size of an area on a chip, power consumption, and processing efficiency when executing specialized application(s).

In contrast, an application-specific instruction-set processor (ASIP) also known as a domain-specific or a custom processor is processor designed with high level of optimization for specific applications. The terms may be used interchangeably. By means of an example mobile devices, e.g., mobile phones require low power consumption, while requiring certain specialized processing capability. Because the requirements of a target application are known, the design can be optimized for the requirement, e.g., low power consumption, small size of an area on a chip, adequate processing efficiency, and other requirements known to a person of ordinary skills in the art. The optimization is achieved by implementing some software functionality in hardware and adapting the instruction set to the target application.

Development of any processor starts with determining requirements for the processor in accordance with the target domain; the requirements being summarized in a processor specifications. Traditionally, the development comprises several iterations usually done manually. In the first step of the iteration, tools for programming and validation of the processor performance are developed from the processor specifications. Such tools may comprise e.g., higher programming language compiler, assembler, simulator, profiler, or any other tools known to a person or ordinary skill in the art. These tools serve for a development of an instruction set. First, preliminary instruction set is determined in accordance with an instruction set for the target domain. By means of an example, an instruction set for a general processor domain will comprise instruction set different than an instruction set for a digital signal processor domain. Next the target application(s) written in a higher programming language are compiled into an executable file. In this aspect, the term compiling is understood as translation of the higher programming language application into executable file by means of a compiler, an assembler, and a linker; the executable file comprising a plurality of instructions. The instruction set is then validated by the executable file being executed by the simulator of the processor. The simulator or profiler of the processor simulates the application compiled into the executable file so that debugging may be carried out before the processor design is committed to a physical processor implementation (target hardware technology), e.g., on a silicon chip, or a Field Programmable Gate Array (FPGA). The results of the simulation/profiling may indicate a need to change/optimize the basic instruction set and/or a need to change the processor specifications. Of course, any such change requires another iteration, changing of all the tools, a task demanding on both time and resources, since the changes are carried out manually.

In the next step, after the instruction set was stabilized, the optimal micro-architecture is designed in accordance with the processor specifications. Micro-architecture is an implementation of an architecture, wherein the architecture comprises an instruction set, registers and other components exposed to the programmer. Consequently, the micro-architecture design comprises design decision regarding, e.g., the number and types of Arithmetic Logic Units (ALUs), a number of pipeline stages, connection to a memory subsystem, registers, and other design decision known to a person of ordinary skill in the art. After the micro-architecture has been designed, the instruction set and the micro-architecture are re-evaluated in view of the target application and target hardware technology. This re-evaluation may affect only the micro-architecture, only the instruction set, or both. As mentioned supra, any such change requires changes of all the tools.

The above-mentioned complexity resulted in development of Electronic Design Automation (EDA) tools, automating the above-described tasks. One category of the EDA tools comprises tools for processor design, validation, and verification. These tools eliminate or at least mitigate the design complexity, allow shorter development time, and deliver the resulting product in higher quality.

A class of the EDA tools is focused on generating programming and simulation tools, e.g., high level programming language (HLL) compiler, assembler, simulators, debugger, profiler, as well as hardware description in hardware description languages, e.g., VHSIC Hardware Description Language (VHDL), Verilog, SystemVerilog, and other languages known to a person of ordinary skills in the art in accordance with the processor specifications. To describe an instruction set and micro-architecture of a processor, Architecture Description Languages (ADL) have been developed. As known to a person of ordinary skill in the art, the ADLs can be categorized as ALDs using templates and as generic ADLs. The first category, i.e., ADLs with templates, allows modification of limited parts of the processor. An example of an ADL using templates is a Tensilica Instruction Extension (TIE), which is further limited to customization of the Xtensa processor core architecture. The second category, i.e., generic ADLs, allows modification of any part of the processor. Examples of generic ADLs are Language for Instruction Set Architectures (LISA), nML, and versions 1 and 2 of a Codasip Architecture Language (CodAL), Codasip, s.r.o.

The latter category provides two models or views on the designed processor that differ in the levels of abstraction.

The first level of abstraction, represented by the instruction accurate model (IA), is simpler and targeted at design space exploration (DSE), i.e., exploring optimal instruction set. IA model is primarily aimed at the description of instruction set architecture (ISA) and defines instructions with limited implementation details. The hardware cannot be generated from the IA model, but is suitable for generating at least some of the programming and simulation tools.

The second level of abstraction, represented by the cycle accurate (CA), is targeted at micro-architecture design for the target hardware technology. From the CA model a processor hardware description is generated in the hardware description languages.

The ADL have some limitations. One, the IA model is not aware of at least some details of the CA model; consequently, the programming and simulation tools provide only an estimation of the target performance. Furthermore, the IA model can implement instruction differently and, therefore, the CA model cannot handle programs correctly. By means of an example, the IA model may implement instruction(s) that performing an addition, but the CA model may execute the same instruction(s) as subtraction. Yet another problem is code repetition, arising from the fact that some portions of the code, e.g., constants, instruction encoding, and other portions known to a person of ordinary skill in the art must occur in the IA model as well as in the CA model. Therefore, a designer must ensure not only that these code portions are included in both models, but also that these portions are identical; otherwise such discrepancy may lead into the inconsistency between IA and CA model and therefore the design contains errors. To mitigate or correct these problems, verification has to be done. Such verification is disclosed in U.S. Pat. No. 9,235,670.

SUMMARY

In an aspect of the disclosure, a method for an automation of processor design, validation, and verification according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 1:
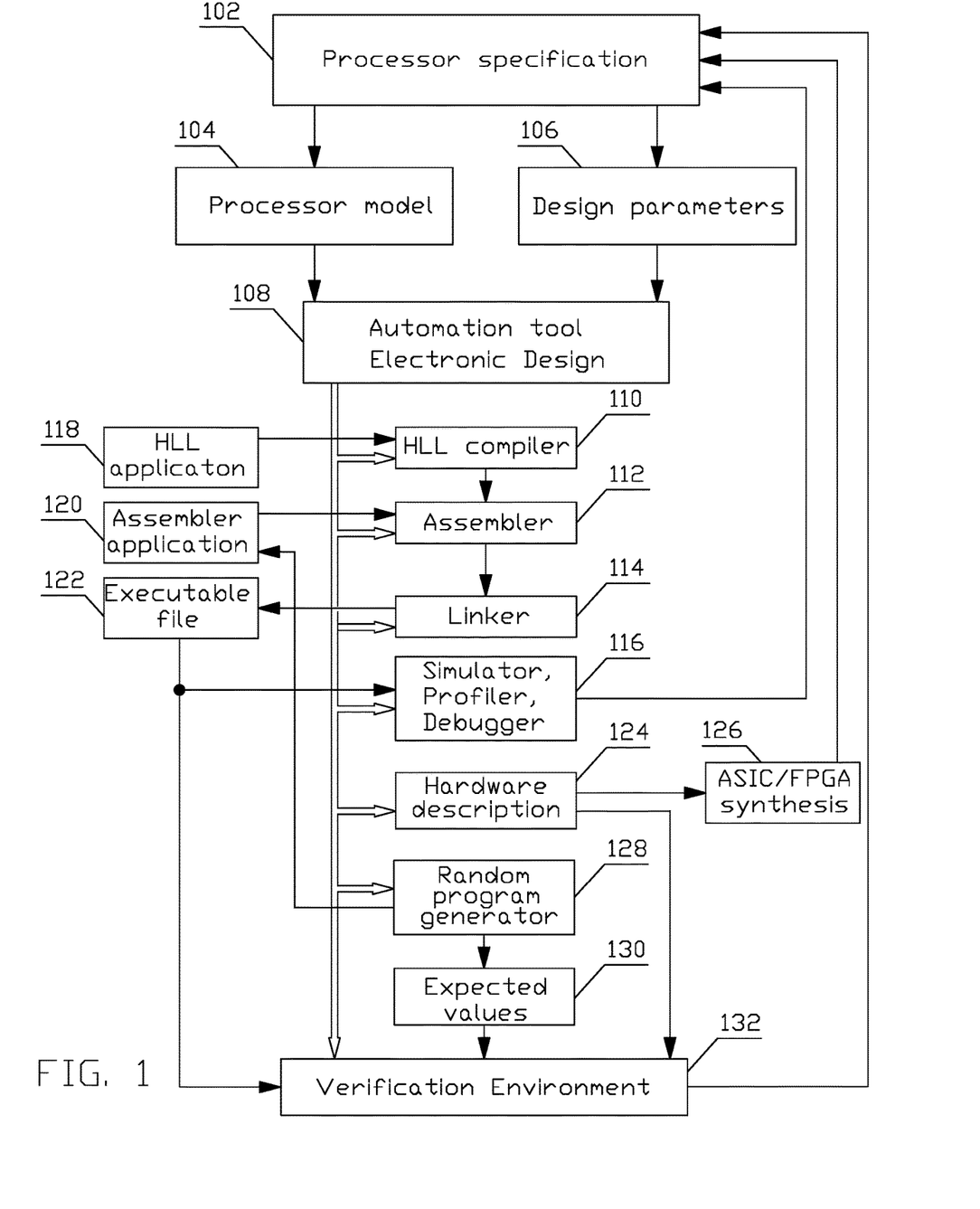
FIG. 1 depicts a conceptual structure and information flow among elements of the conceptual structure for automatic design and verification of an application-specific instruction-set processor in accordance with an aspect of this disclosure.
Figure 2:
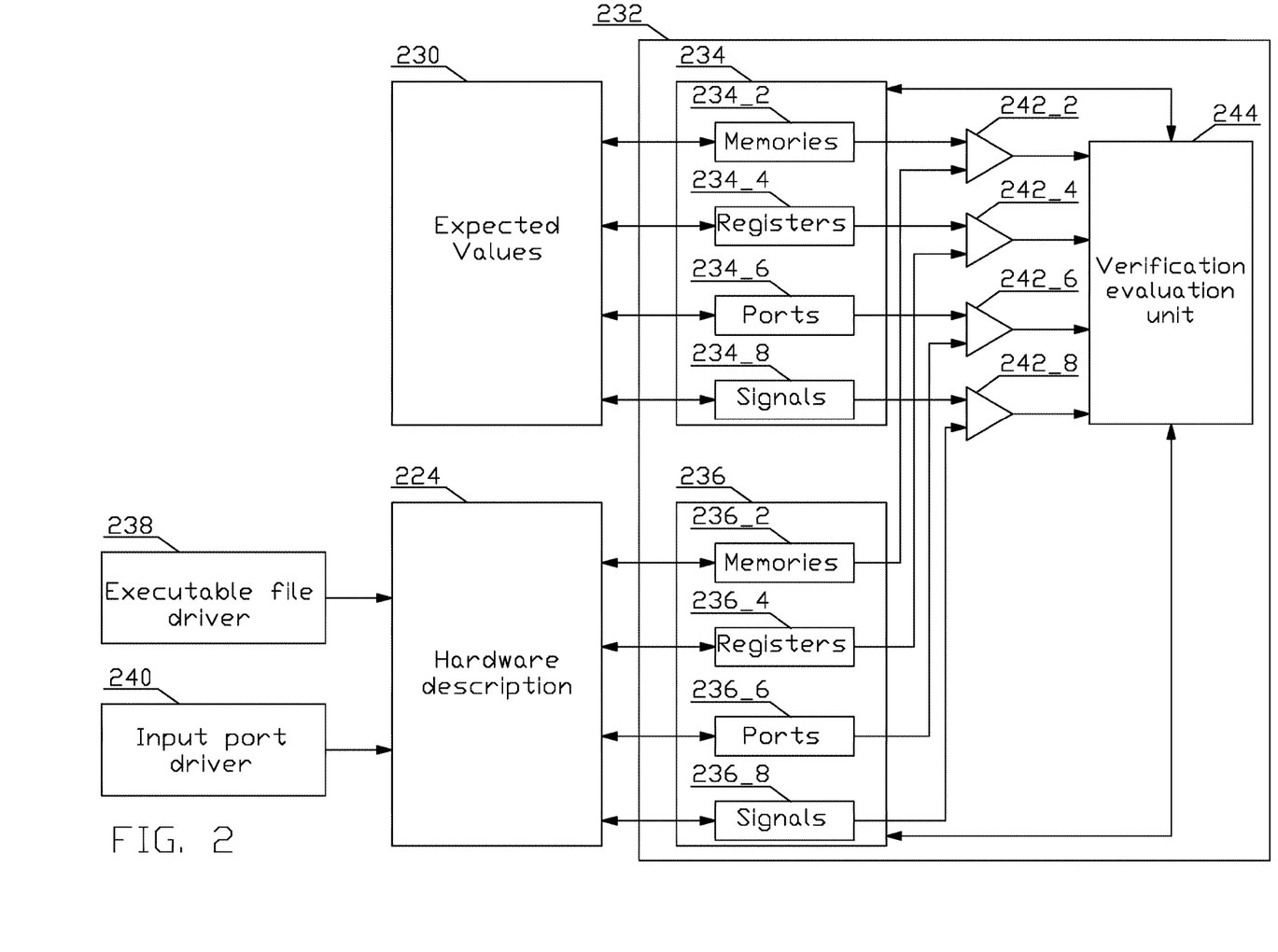
FIG. 2 depicts a conceptual structure and information flow among elements of the conceptual structure for verification of a processor model in accordance with an aspect of this disclosure.

The description of like structural elements among the figures, is not repeated, the like elements have reference numerals differing by an integer multiple of 100, i.e., reference numeral 100 in FIG. 1 becomes reference numeral 200 in FIG. 2; unless differences and/or alternative aspects are explicitly noted. An expression "_X" in a reference indicates an instance of an element of a drawing where helpful for better understanding. A double line indicates entities generated by the entity originating the double line; any unreferenced single or double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

As used herein, the term design of a processor is intended to disclose a design of both the representation of the physical device, e.g., a hardware description and a design of programming and simulation tools enabling validation and verification, as well as programming of the representation of and the physical device itself.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

FIG. 1 depicts a conceptual structure and information flow among elements of the conceptual structure for design, validation, and verification of a processor. The elements comprise hardware or software entities implementing the blocks and/or the block's functionality.

The design process starts by determining requirements for a processor to be developed in accordance with the target application, resulting in processor specification 102, which determine tools and processor design generated by an Electronic Design Automation (EDA) tool 108 as disclosed infra. Such processor specifications 102 comprise a single description unifying an instruction set specifications and a micro-architecture specifications. The processor specification 102 may be in a form of one or more text files, e.g., one file comprising the specifications for the instruction set, another file comprising the specifications for the micro-architecture, drawings, or any other file form known to a person of ordinary skills in the art. The specifications may change during the design process based on results of processor simulation, synthesis, and validation and verification. Next step is to create a processor model 104 based on the processor specification 102. The processor model 104 is written using architecture description language. To overcome the above-mentioned problems arising from use of two separate models, a new type of architecture description language has been developed. Such language enables the processor specifications 102 to be described as a design of a single processor model 104 that combines, e.g., by means of interleaving, the two levels of abstraction. In other words, the language is design in a way that allows to unify the instruction set description with a description of the micro-architecture details. That is, the description of an instruction contains information about when and from where the operand(s) for the instruction(s) are provided, which functional unit performs the instruction, the timing of the instruction, and when and where the results are provided. An example of the new type of a language, enabling a development of a single model is version 3 of a Codasip Architecture Language (CodAL), developed by Codasip, s.r.o. Since the version identification may be subject to change, the new type of a language, enabling a development of a single model is hereinafter referred to as Codasip Architecture Language.

Consequently, replacing the two separate IA and CA models into a single model 104 unifying the components of the IA model and the CA model, removes the inconsistency problems, as well as the problem code repetition. Furthermore, the verification of the two-model scenario is not needed. This, however, does not mean that the need for the processor verification does not exist. However, instead of verification based on a reference model as disclosed in the above-mentioned patent, a novel verification process using a random program generator as disclosed infra, is utilized.

The single processor model 104 may be supplied by the EDA tool 108 provider and, if so desired, modified by the user in accordance with the processor specifications 102. Alternatively, the single processor model 104 for the specific EDA tool 108 may be produced and supplied by a third party. Finally, the single processor model 104 may be designed by the user of the EDA tool 108.

One type of the single processor model 104 comprises a configurable model that is a pre-defined processor model wherein certain features may be changed within the ranges allowed by the model. In another aspect, the single processor model 104 comprises a template-based model that contains an un-modifiable features of a processor and a user-modifiable or even user-designed features of the processor. In yet another aspect, the single processor model 104 comprises a green-field model that is a model wherein the user may modify and/or design any feature of the processor, including such low level features as a pipeline stages, number of registers, number of arithmetic-logic units, and any other features known to a person of ordinary skill in the art.

The EDA tool 108 is agnostic to the supplier and/or the type of the single processor model 104.

In addition to the single processor model 104, the user may specify optional design parameters 106 influencing the behavior of the EDA tool 108. By means of an example, such parameters may comprise e.g., a parameter instructing the EDA tool 108 to prioritize low power consumption over other properties, e.g., processing efficiency. By means of another example, a parameter may provide additional information about the single processor model 104 micro-architecture.

The single processor model 104 together with the design parameters 106 comprise inputs to an EDA tool 108. Therefore, once the single processor model 104 has been designed and the design parameters 106 have been determined, the EDA tool 108 may be used for the processor design.

In accordance with the single processor model 104, or a combination of both the single processor model 104 and the optional design parameters 106, the EDA tool 108, automatically generates the programming and simulation tools, such as an HLL compiler 110, an assembler 112, a simulator, a profiler, and a debugger, collectively shown as a reference 116, and other tools known to a person of ordinary skills in the art. Thus, a tool, e.g., the HLL compiler 110, the assembler 112, the simulator, profiler and debugger, collectively shown as a reference 116 may be generated from the single processor model 104 and the optional design parameters 106. In an aspect, a linker 114 may be a stand-alone tool, common to all the different processor models 104. In another aspect, the linker 114 is generated by the EDA tool 108, and accordingly is unique for the single processor model 104. The uniqueness of the linker 114 may further improve the generated executable file 122, e.g., by code size optimization.

Once the programming and simulation tools are generated, the performance of the single processor model 104 needs to be validated. Such performance is validated by providing application(s) with known results, also known as benchmark application(s). The benchmark applications are provided by a third party, trusted by the designers and users of processors, to reflect an efficient implementation of the benchmark applications. Such a system further ensures a comparison between different processors. By means of an example, consider a processor that that implants calculation of a Fast Fourier Transform (FFT). The benchmark application contains input data and code necessary for enable the processor to calculate the FFT. Because an algorithm for calculation of FFT is known, the algorithm is used to calculate output form the input data by means independent from the processor. Thus the resulting value provided by the benchmark application is known.

The benchmark application is compiled by the programming tools and is executed by the simulated single processor model 104. Thusly obtained resulting value is then compared with the resulting value provide by the benchmark application. The single processor model 104 is validated, provided that the resulting values agree, and all the required parameters, e.g., speed of processor calculation, power consumption, and other parameters known to a person of ordinary skill in the art, are within processor's specifications 102.

In addition to the third party benchmark applications, processor designer(s) or software developers may develop benchmark applications, to assist in refining the design or internally validating features not necessarily validated by the third party benchmark application.

In one aspect, application(s) to be executed on the simulator of the single processor model 104 are provided in high level language (HLL) by the HLL application(s) 118. The HLL application(s) 118 may comprise e.g., application(s) written by the user, application(s) supplied in a test suites together with application(s) testing benchmarks from the EDA tool 108, or any other application sources known to a person of ordinary skills in the art. The HLL may be e.g., C language, C++ language, Object Pascal, or any other language known to a person of ordinary skills in the art. The compiler 110 translates the HLL applications(s) 118 into a symbolic instruction language representation of the HLL application(s) 118, e.g., an assembly language.

In another aspect, instead of using HLL the user may choose to provide the application(s) directly in an assembly language by the assembler application 120. In yet another aspect, the random program generator 128 can randomly generate the application(s) to be used. The different aspects are not mutually exclusive in that the EDA tool 108 may be configured to enable either aspect and the user may choose one of the aspects.

The assembly language representation of the application(s) 120, obtained by either aspect supra, is provided to the assembler 112, which produces a binary representation of the application(s) in a form of one or more object files. The one or more object files are provided to the linker 114, which accepts the one or more object files and links, i.e., combines the one or more object files into a single executable file 122.

The executable file 122 is provided to the simulator, the profiler, and/or the debugger 116 that enable simulation of the executable file 122. The simulator duplicates, i.e., simulates the functions of the single processor model 104 so that the simulated behavior closely resembles the behavior of the single processor model 104. The profiler monitors and analyses the different functions of the processor during the executable file execution, and is able to output summary of the events observed, stream of recorded events, and any other output known to a person of ordinary skills in the art. By means of an example, such an output may comprise information like: list of executed instructions, pipeline statistics, and other output information known to a person of ordinary skills in the art.

In addition to the output information, it is possible to perform a detailed examination of values of different processor's resources, i.e., input/output ports, registers, memory, and other processor's resources known to a person of ordinary skills in the art, during the execution of the executable file. A person of ordinary skills in the art will appreciate that the simulator, the profiler, and the debugger were described separately for explanation of the functions; in an aspect the functions may be combined with one another. By means of an example, a debugger may be combined with profiler in a single component.

After simulation, debugging, or profiling, the produced output information results and debugger results are reviewed by the user vis-à-vis the known expected results, and the user decides whether changes to processor specifications 102 need to be made. When changes to processor specifications 102 and/or the design parameters 106 are needed, the changes are then used to change the single processor model 104, and the process of the EDA tool 108 automatically generating the programming and simulation tools and subsequent evaluation of the executable file 122 by simulation, debugging, or profiling is repeated until the simulation and profiling provides satisfactory outputs results. Because a single description for generating all the programming and simulation tools is used in the single processor model 104 the modification of the single processor model 104 is simplified because a correction to the single description used for programming and simulation tools, re-generates all the programming and simulation tools.

At that time, the single processor model 104 has been validated in respect to the set of characteristics of the processor's specifications 102, which can be validated at this stage of design, e.g., speed of calculation, application memory footprint, number of memory accessed, and other characteristics known to a person of ordinary skill in the art. Other set of characteristics of the processor specifications 102, e.g., frequency of operation, area, and/or power consumption, cannot be validated at this stage of design. The reason is that the simulator 116 is not aware of the target hardware technology that is used for the processor implementation and therefore cannot be used for the complete validation. By means on an example, consider a hardware technology to be implemented on a 22 nm and 180 nm. Clearly, the processor's area, frequency, and power consumption will be different on 22 nm target hardware technology than on the 180 nm target hardware technology. On the other hand, the different implementation does not affect the speed of calculation or application memory footprint.

To complete the validation, i.e., to validate the other set of characteristics, the Electronic Design Tool 108 next uses the single processor model 104 to generate the hardware description 124 comprising hardware implementation in the language for hardware description and, optionally, a relevant test environment. The hardware description languages may comprise, e.g., VHSIC Hardware Description Language (VHDL), SystemVerilog, Verilog, or other hardware languages known to a person of ordinary skills in the art. The test environment represents an envelope, which is used by developers for rapid testing. The hardware description 124 is provided to an Application Specific Integrated Circuit or a Field Programmable Gate Array (ASIC/FPGA) synthesis module 126 to validate the other characteristics, such as frequency of operation, area, and/or power consumption.

The ASIC/FPGA synthesis module 126 may comprise third-party tools, e.g., Xilinx ISE, Cadence Genus, and other tools known to a person of ordinary skills in the art. The ASIC/FPGA synthesis module 126 takes hardware description 124 and creates a description representing the single processor model 104 for the target hardware technology, e.g., a silicon chip, or an FPGA. The hardware description 124 is provided to the ASIC/FPGA synthesis module 126 and is then validated as described in the paragraph above. The results of the ASIC/FPGA validation is reviewed by the user and changes to processor specifications 102 may be made based on the output results. For instance, if the timing is not closed, i.e., target processor frequency design is not met, then it may lead to addition of one or more pipeline stages to close the timing. When changes to processor specifications 102 are needed, the changes are then used to change the single processor model 104, and the process is repeated until the simulation, profiling and/or implementation results provide satisfactory output results.

Significant advantage of the above-disclosed validation is, that in case that there is a need to repeat the process of validation of the single processor model 104 using the simulator 116, the hardware description 124, or both, is, that such process is very fast and simple because the changes made to the processor's specifications 102, are propagated to only the single processor model 104 and there is no need for the complex and error prone process caused by use of two models.

In one aspect, the validated single processor model 104, i.e., the model that yield the satisfactory results, is input into the EDA tool 108, which generates an HLL compiler 110, an assembler 112, a linker 114, a simulator, a profiler, and a debugger, collectively shown as a reference 116, and other tools known to a person of ordinary skills in the art as well as a hardware description 124, a random program generator 128, and a verification environment 132.

Although as disclosed supra, the current invention utilizes a single unified processor model 104, the need for verification of the micro-architecture implemented as the hardware description 124 vis-a-vis the instruction set is still necessary. As well known to a person of ordinary skill in the art, that an application to be processed may be coded by different sequences of instructions; consequently, it would be desirable to test any and all sequences. Furthermore, the processor must be able to handle circumstances external to the processor. By means of an example, the verification must ensure, that various asynchronous evens that may happen during execution of the sequence of instructions, such as interrupts, exceptions, debugger requests, and other events known to a person of ordinary skilled in the art are correctly processed by the micro-architecture. By means of another example, the processor communicates with a memory using a communication protocol. Since the protocol may be defined by $3^{rd}$ party document, the verification must check that the protocol is followed properly.

As disclosed in detail infra, the hardware description 124 is verified by means of a verification application, i.e., a set of instructions in a form of an executable file 122 executable by the hardware description 124. The result provided by the hardware description 124 upon execution of the verification application must agree with the independently determined result provided by the verification application or by expected values 130. This is true even if the execution is affected by the external event. Thus, considering, e.g., the interrupt mentioned supra, the processor must stop execution of the sequence of instructions, save the state of resources at the time of the interrupt, process the interrupt, and resume the execution of the sequence of instructions at the retrieved state of the resources.

A verification application may comprise parts of a prologue, a main body, and an epilogue. An application prologue is that part of an application that sets initial condition of the hardware description 124 before processing the main body, e.g., initialization of registers, initialization of memory, it may initialize interrupt or exception routines, and other settings known to a person of ordinary skill in the art. The main body comprises the sequence of instructions to be verified. An application epilogue is that portion of an application that sets the condition of the hardware description 124 after finishing processing the main body, e.g., resets the hardware description 124 to pre-application execution conditions, stops the hardware description 124, and other conditions known to a person of ordinary skill in the art.

There are three possible sources of the verification application(s). In one aspect, a designer may provide hand written verification application(s). In another aspect, the EDA tool 108 provides a set of pre-prepared verification application(s). In yet another aspect, the random program generator 128 generates the verification application(s). In all the above mentioned aspects, the entity providing the verification application(s) need to ensure that the verification application(s) provides correct values, i.e., values that would be provided by a correctly working hardware description 124. Such an assurance is termed self-checking thereafter.

The self-checking functionality is enabled by the knowledge of the instruction set and micro-architecture details based on the single processor model 104. That is, a state of the processor's resources is deterministic based on the semantic of the instruction set and the micro-architecture. Consequently, it is possible to generate a verification assembly application 120 that is compiled to executable file 122 that may contain a sequence of instructions and computed state of the processor's resources at any time during the execution of the sequence of instructions. By comparing the actual state of the processor's resources in the hardware description 124 with the computed state, the correctness of the hardware description 124 can be verified. Such resources may comprise, e.g., registers, memories, ALUs, interfaces, and other resources known to a person of ordinary skill in the art.

The size of the sequence of instructions in the verification application depends on the goal of the verification. By means of an example, some instructions may be verified as a single instruction, e.g., LOAD, other instructions need a preceding instruction(s) setting the values on which the verified instruction depends, e.g., ADD. However, as disclosed supra, it would be desirable to test any and all sequences. It logically follows, that the use of the hand written verification application(s), or of the EDA tool 108 provided set of pre-prepared verification application(s) is of a limited use because it is practically impossible to satisfy such a goal. On the other hand, use of the random program generator 128 lends itself to taking an advantage of a power of another processor or a computer, which may execute the functionality of the random program generator 128 and its functionality arbitrary number of times.

The random program generator 128 is aware of the instruction set and semantics and the microarchitecture of the processor model 104, therefore, the random program generator 128 may generate at least one expected value corresponding to a state of each of the resource of the processor model's 104 to be verified. Such resources may comprise, e.g., registers, memories, and/or other processor's resources known to a person of ordinary skill in the art. The random program generator 128 then generates at least one sequence comprising at least one instruction yielding the at least one expected value. The term expected value refers to the value of the state of the processor model's 104 resource upon execution of all the instructions in the sequence, should the processor model 104 satisfy the specifications 102. Comparison of the expected values with the values resulting by executing the random stream of instructions by the hardware description 124 is performed by the verification environment 132. In case of the sequence comprising more than one instruction, the random program generator 128 may generate intermediate expected values, i.e., values of the processor model's 104 resources upon execution of each intermediate instruction of the sequence. Generation of the expected values and the optional intermediate expected values and the corresponding stream of instructions utilizes a satisfiability modulo theories (SMT) solver and the values are stored in expected values 130 storage. Thanks to this approach, there is no need for a reference model. The random program generator 128 is parametrizable, therefore, a user may influence parameters of any part of the application(s), e.g., the random values of the resources, a length of the stream of instructions in the main body, and other parameters known to a person of ordinary skill in the art.

Once the EDA tool 108 generates hardware description 124 and the random program generator 128, the EDA tool 108 generates the verification environment 132 from the validated single processor model 104. The generated verification environment 132 comprises a program specifying usage of a set of tools, libraries and/or functions designed to support verification. In particular, the verification environment 132 program creates instances of the drivers and conceptual structures, defines relationships there-between, as disclosed in reference to FIG. 2 infra. A driver is a software program that operates and/or controls a particular device/unit within a verification environment that is attached to the driver. The verification environment 132 then instructs the set of tools, libraries and/or functions how to access the drivers, conceptual structures, the hardware description 124, and how and what verification tests to execute. By means of an example, such a set of tools, libraries and/or functions may comprise tools, libraries and/or functions supplied by the EDA tool 108, or third party tools, e.g., Universal Verification Methodology (UVM) libraries and tools provided in ModelSim by Mentor Graphics, and other tools and functions known to a person of ordinary skills in the art.

The hardware description 124, the executable file 122 with the expected values and optionally the intermediate expected values, are provided to the generated verification environment 132. The generated verification environment carries a verification of the processor design by verifying the hardware description 124 against the expected values and/or the optionally provided intermediate expected values of the resources upon executing the executable file 122.

Although the verification process supra, was disclosed in the aspect of using the validated single processor model 104, such is not necessary. In another aspect, the verification may precede the validation, i.e., the Electronic Design Tool generate the hardware description 124 from the processor's specifications 102 and the optional design parameters 106.

FIG. 2 depicts a conceptual structure and information flow among the elements of the conceptual structure for automatic verification of a processor model in accordance with an aspect of this disclosure. The elements comprise hardware or software entities implementing the structure and its functionality. To further clarify the relationship between certain blocks of FIG. 1 as referenced in FIG. 2 and associated text, references the blocks of FIG. 1, are in parenthesis.

As disclosed supra, the verification environment 232 is a program comprising instructions for the set of tools, libraries, and/or functions, designed to support verification. The verification environment 232 contains expected results unit 234 and a monitor unit 236 that are generated from the processor model (104) or the validated processor model (104), by the EDA tools (108). Additionally, the EDA tools (108) generate verification support, e.g., drivers, structures, interfaces to the hardware description 224, as well as the relationships there between. As disclosed supra, the random program generator (128) generates the expected values and provides them into a storage 230, so that the expected values may be accessed by the expected results unit 234. The values of the processor's resources produced by the hardware description 224 may be stored in the monitor unit 236 for further evaluation.

Each of the expected results unit 234 and the monitor unit 236 comprises at least one processor's resources characterizing the processor. Such an arrangement enables verification of a single processor's resource. By means of an example, during processor design and evaluation, a decision may be made to add a vector ALU; consequently, upon validation the updated processor model (104) a verification application may be generated to verify only the vector ALU functionality.

Although FIG. 2 depicts only processor's resources comprising memories 232_2, 236_2, registers 232_4, 236_4 (including register files), output ports 232_6, 236_6, and signals 232_8, 236_8, such is for illustration purposes only, and any processor's resources or a hardware component known to a person of ordinary skill in the art is contemplated. A memory is a simulated representation of any physical devices used to store instructions and/or data on a temporary or permanent basis as will be implemented in the processor. A register is a simulated representation of a small amount of storage being (typically) addressed by mechanisms other than the memory and can be thus accessed more quickly. The registers 232_4, 236_4 represent both architectural registers, i.e., registers exposed to the programmer as well as micro-architectural registers, i.e., registers that are not available to the programmer, but are used internally by the processor. A port is a simulated representation of any physical input/output port used to pass information to other components connected to the processor. A signal is a simulated representation of a path along which information flows among components of the processor, e.g., a wire.

To enable execution of an executable file (122) by the hardware description 224, the EDA tool (108) further generates an executable file driver 238. Furthermore, some executable files require that values of input ports, either manually provided by a user or generated by the random program generator (128), are input to the hardware description 224. Such an input port value may comprise an interrupt, data to be processed, and/or any other input known to a person of ordinary skills in the art. Consequently, the EDA tool (108) further generates an optional input port driver 240.

Once the executable file (122) and, optionally, the values of input ports are input into the hardware description 224, the verification is started by initiating execution of the executable file (122) in the verification environment 232. Throughout the execution values of the memories 236_2, the registers 236_4, the output ports 236_6, and the signals 236_8 produced by the hardware description 224, are stored in the hardware description 224 or in the monitor unit 236. The expected values 226 of the memories 232_2, the registers 232_4, the output ports 232_6, and the signals 232_8, produced by the random program generator (128) are stored in the storage 230 of the expected values, from which they are passed to the expected values unit 234.

When the execution finishes, the values from the memories 234_2 and 236_2 are provided to a comparator 242_2. The expected values unit 234 accesses the expected values storage 230, takes a snapshot of the values in the memories 232_2 and the monitor unit 236 accesses the hardware description 224 and takes a snapshot of the values in the memories 236_2.

The comparator 242_2 executes a function that steps through the values in the memories 234_2 and 236_2, compares—at each of the steps—the values between the memories 234_2 and 236_2 and provides a result of the comparison to the verification evaluation unit 244.

Identical procedure is used to obtain values in the registers 234_4 and 236_4, which are provided to a comparator 242_4. The comparator 242_4 executes a function that steps through the values in the registers 234_4 and 236_4, compares—at each of the steps—the values between the registers 234_4 and 236_4 and provides a result of the comparison to the verification evaluation unit 244.

Identical procedure is used to obtain values of the signals 234_8 and 236_8, which are provided to a comparator 242_8. The comparator 242_8 executes a function that steps through the values in corresponding signals 234_8 and 236_8, compares—at each of the steps—the values between the signals 234_8 and 236_8 and provides a result of the comparison to the verification evaluation unit 244.

Identical procedure is used to obtain values of the output ports 234_6 and 236_6, which are provided to a comparator 242_6. The comparator 242_6 executes a function that steps through the values of corresponding output ports 234_6 and 236_6, compares—at each of the steps—the values between the output ports 234_6 and 236_6 and provides a result of the comparison to the verification evaluation unit 244.

The verification evaluation unit 244 evaluates the result of the comparison. Such an evaluation may be a fail/pass report. However, the user may further instruct the verification evaluation unit 244 to request from the expected values unit 234 and monitor unit 236 a more detailed report. Such a report may provide, e.g., specific values which differ between the expected values unit 234 and monitor unit 236; coverage of instruction sets, i.e., a number and/or a list of instructions that were executed; a number and/or a list of sequence of instructions that were executed, and a number and/or a list of sequence of instructions which were not executed; register and memory values, and other information known to person of ordinary skill in the art implemented by the verification evaluation unit 244.

The fail/pass report or the detailed report is then used to revise the processor specifications (102), and, if necessary, to change the processor model (104), and repeat the design, validation, and verification process.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for automatic design of a processor and programming and simulation tools, comprising:
   developing a single model of the processor from processor's specifications comprising a single description specifying for each instruction micro-architectural details, including at least one of information about functional unit to perform the instruction, or a location of the input and output operands, or timing, thus unifying instruction set specifications and micro-architecture specifications into a single level of abstraction;
   providing the single model of the processor to an Electronic Design Automation tool;
   wherein the Electronic Design Automation tool is configured for automatically:
   generating a hardware description from the single model of the processor; and
   generating programming and simulation tools from the single model of the processor.

2. The method as claimed in claim 1, further comprising:
   providing at least one optional design parameter in addition to the single model of the processor to the Electronic Design Automation tool; and
   wherein the Electronic Design Automation tool is further configured for automatically:
   generating a hardware description from the single model of the processor and the at least one optional design parameter; and
   generating programming and simulation tools from the single model of the processor and the at least one optional design parameter.

3. The method as claimed in claim 1, wherein the developing the single model of the processor from the processor's specifications comprises:
   developing the single model in a language designed to provide the single description of the instruction set specifications and the micro-architecture specifications into the single level of abstraction.

4. The method as claimed in claim 3, wherein the language, comprises:
   a Codasip Architecture Language.

5. The method as claimed in claim 1, wherein the Electronic Design Automation tool is further configured for automatically:
   determining validity of the single model of the processor; and
   providing the single model of the processor when the determining satisfies characteristics of the processor's specifications.

6. The method as claimed in claim 5, further comprising:
   modifying the specification when the determination does not satisfy the characteristics of the processor's specifications; and
   repeating the method as claimed in independent claim 1.

7. The method as claimed in claim 5, wherein the determining validity of the single model of the processor comprises:
   determining a first set of characteristics of the single model of the processor by synthesizing a target hardware technology from the hardware description;
   providing at least one benchmark application;
   executing the at least one benchmark application by a representation of the single model of the processor; and
   determining whether the output data of the benchmark application and the output data resulting from the executing agree, and all other required parameters of the execution satisfy the characteristics of the processor's specifications.

8. The method as claimed in claim 7, wherein the representation of the single model of the processor comprises:
   a simulator tool and the hardware description.

9. The method as claimed in claim 7, wherein the executing the at least one benchmark application by the representation of the single model of the processor comprises:
   executing the at least one benchmark application on the simulation tool; and
   executing the at least one benchmark application on the hardware description.

10. A non-transitory computer-readable medium, having stored thereon instructions that when executed by a computing device, cause the computing device to perform operations comprising:

accepting a single model of the processor developed from processor's specifications comprising a single description specifying for each instruction micro-architectural details, including at least one of information about functional unit to perform the instruction, or a location of the input and output operands, or timing, thus unifying instruction set specifications and micro-architecture specifications into a single level of abstraction;

instantiating an Electronic Design Automation tool;

providing the single model of the processor to the Electronic Design Automation tool; and causing the Electronic Desing tool to:

generate a hardware description from the single model of the processor; and generate programming and simulation tools from the single model of the processor.

11. The non-transitory computer-readable medium as claimed in claim 10, wherein the instructions executed by a computing device causes the computing device to perform operations comprising:

causing the Electronic Design Automation tool to:

determine validity of the single model of the processor and provide the single model of the processor when the determining satisfies characteristics of the processor's specifications.

12. The non-transitory computer-readable medium as claimed in claim 11, wherein the instructions executed by a computing device, further cause the computing device to perform operations comprising:

repeating the method as claimed in independent claim 10, wherein the accepting the single model of the processor developed from processor's specifications comprises:

accepting the single model of the processor developed from modified processor's specifications when the determination does not satisfy the characteristics of the processor's specifications.

13. A method for automatic a verification of a processor design, comprising:

developing a single model of the processor from processor's specifications comprising a single description specifying for each instruction micro-architectural details, including at least one of information about functional unit to perform the instruction, or a location of the input and output operands, or timing, thus unifying instruction set specifications and micro-architecture specifications into a single level of abstraction;

providing the single model of the processor to an Electronic Design Automation tool;

generating by the Electronic Design Automation tool automatically a hardware description, at least a programming tool, a random program generator, and a verification environment from the single model of the processor;

generating by the random program generator for a state of each resource of the hardware description to be verified at least one expected value and at least one sequence comprising at least one instruction yielding the at least one expected value;

determining by the verification environment whether the at least one expected value agrees with at least one value for the state of each resource of the hardware description to be verified resulting from an execution of the at least one sequence; and providing the hardware description when the determining satisfies the processor's specification.

14. The method as claimed in claim 13, further comprising:

modifying the specification when the determining by the verification environment does not satisfy the processor specification; and repeating the method as claimed in independent claim 13.

15. The method as claimed in claim 13, wherein the generating by the random program generator for a state of each resource of the hardware description to be verified at least one expected value and at least one sequence comprising at least one instruction yielding the at least one expected value comprises:

generating by the random program generator for a state of each resource of the hardware description to be verified at least one expected value and at least one intermediate value at least one sequence comprising at least one instruction yielding the at least one expected value and at least one intermediate instruction yielding the at least one intermediate value; and wherein the determining by the verification environment whether the at least one expected value agrees with at least one value for the state of each resource of the hardware description to be verified resulting from an execution of the at least one sequence comprising the at least one instruction by the hardware description comprises:

determining by the verification environment whether the at least one expected value and the at least one intermediate expected value agrees with at least one value and at least one intermediate value for the state of each resource of the hardware description to be verified resulting from an execution of the at least one sequence.

16. The method as claimed in claim 13, further comprising:

providing at least one optional design parameter in addition to the single model of the processor to the Electronic Design Automation tool;

wherein the Electronic Design Automation tool is further configured for automatically:

generating a hardware description from the single model of the processor and the at least one optional design parameter; and generating programming and simulation tools from the single model of the processor and the at least one optional design parameter.

17. The method as claimed in claim 13, wherein the developing the single model of the processor from the processor's specifications comprises:

developing the single model in a language designed to provide the single description of the instruction set specifications and the micro-architecture specifications into the single level of abstraction.

18. The method as claimed in claim 17, wherein the language, comprises:

a Codasip Architecture Language.

19. The method as claimed in claim 13, further comprising:

determining validity of the single model of the processor automatically by the Electronic Design Automation tool before performing the verification.

20. A non-transitory computer-readable medium, having stored thereon instructions that when executed by a computing device, cause the computing device to perform operations comprising:

accepting a single model of the processor developed from processor's specifications comprising a single description specifying for each instruction micro-architectural details, including at least one of information about functional unit to perform the instruction, or a location of the input and output operands, or timing, thus unifying instruction set specifications and micro-architecture specifications into a single level of abstraction;

generating a by an Electronic Design Automation tool automatically a hardware description, at least a programming tool, a random program generator, and a verification environment from the single model of the processor;

generating by the random program generator for a state of each resource of the hardware description to be verified at least one expected value and at least one sequence comprising at least one instruction yielding the at least one expected value;

determining by the verification environment whether the at least one expected value agrees with at least one value for the state of each resource of the hardware description to be verified resulting from an execution of the at least one sequence; and providing the hardware description when the determining satisfies the processor's specification.

21. The non-transitory computer-readable medium as claimed in claim 20, wherein the instructions executed by a computing device, further cause the computing device to perform operations comprising:

modifying the specification when the determining by the verification environment does not satisfy the processor specification; and repeating the operations as claimed in independent claim 20.

22. The non-transitory computer-readable medium as claimed in claim 20, wherein the instructions executed by a computing device, further cause the computing device to perform operations comprising:

determining validity of the single model of the processor automatically by the Electronic Design Automation tool before performing the verification.

* * * * *